United States Patent
Axe et al.

(10) Patent No.: US 10,914,223 B1
(45) Date of Patent: Feb. 9, 2021

(54) PARTICULATE MATTER SENSOR HARDWARE PROTECTION IN AFTER-RUN

(71) Applicant: GM Global Technology Operations LLC, Detroit, MI (US)

(72) Inventors: Bryan D. Axe, Farmington Hills, MI (US); Gaetano Di Venti, Enna (IT); Francesco Cannarile, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/523,317

(22) Filed: Jul. 26, 2019

(51) Int. Cl.
  *F01N 11/00* (2006.01)
  *F01N 13/00* (2010.01)

(52) U.S. Cl.
  CPC .......... *F01N 11/007* (2013.01); *F01N 13/008* (2013.01); *F01N 2550/22* (2013.01); *F01N 2560/05* (2013.01); *F01N 2560/20* (2013.01)

(58) Field of Classification Search
  CPC ............. F01N 2240/16; F01N 2560/05; F01N 2560/20; F01N 2900/1628
  See application file for complete search history.

(56) References Cited

U.S. PATENT DOCUMENTS

| | | | |
|---|---|---|---|
| 2009/0139212 A1* | 6/2009 | Miwa | F02D 41/222 60/277 |
| 2016/0061691 A1* | 3/2016 | Stojicevic | F02D 41/1466 73/23.31 |
| 2017/0051650 A1* | 2/2017 | Nakata | F01N 3/023 |
| 2017/0122179 A1* | 5/2017 | Miyagawa | F01N 3/021 |
| 2018/0259439 A1* | 9/2018 | Andoh | F02D 41/1466 |
| 2019/0203623 A1* | 7/2019 | Yoo | F01N 3/2066 |

FOREIGN PATENT DOCUMENTS

JP      2017096153 A  *  6/2017  .............. F01N 11/00

OTHER PUBLICATIONS

Machine translation of JP 2017-096153 A, accessed Jul. 6, 2020. (Year: 2020).*

\* cited by examiner

*Primary Examiner* — Jonathan R Matthias

(57) ABSTRACT

A method for mitigating against failure of a particulate matter sensor of an automobile vehicle includes: determining if a key-off event is present, identifying an engine is off in a vehicle after-run mode; defining when local environmental conditions are outside of mechanical limits of a particulate matter (PM) sensor; identifying input values to reverse the local environmental conditions of the PM sensor; and controlling operation of a heating element of the PM sensor to achieve the input values to reverse the local environmental conditions during the vehicle after-run mode.

16 Claims, 6 Drawing Sheets

PARTICULATE MATTER SENSOR HARDWARE PROTECTION IN AFTER-RUN

INTRODUCTION

The present disclosure relates to particulate matter sensors used in automobile vehicle exhaust systems.

Vehicles powered by internal combustion engines including diesel engines, gasoline engines and hybrid vehicles are typically equipped with exhaust after-treatment catalysts, filters, adsorbents, and other devices to comply with regulatory exhaust emission standards for carbon monoxide (CO), unburned hydrocarbons (HC), oxides of nitrogen (NOx), particulate matter (PM), and the like. The effectiveness of exhaust after-treatment devices for removing the regulated emissions can vary with engine operating conditions.

Automobile vehicles and particularly vehicles having diesel engines commonly use a sensor to determine levels of particulate matter that accrue in or pass through a vehicle exhaust system filter during operation. A particulate matter sensor is provided to meet vehicle emission standards. The particulate matter sensor is used to identify the health of the particulate matter filter, and therefore if the particulate matter filter is deteriorating. Particulate matter sensors commonly include a sensor surface having a circuitry pattern imprinted on the surface. As particulate matter, normally in the form of carbon accrues on the particulate matter sensor, a circuit is completed by the conductive matter of the exhaust particulates causing a current rise indicative of the amount of particulate matter accumulation over time. The particulate matter may be consumed during normal exhaust system temperature operation or the particulate matter sensor can be removed and cleaned periodically to remove built-up particulate matter to ensure accurate sensor readings over time.

Particulate matter sensors having one or more ceramic insulation layers are susceptible to delamination cracking of the ceramic layers due to buildup of water if the water subsequently freezes. Particulate matter sensor failure can therefore result.

Thus, while current vehicle exhaust system particulate matter sensors achieve their intended purpose, there is a need for a new and improved system and method for protecting particulate matter sensors and mitigating the potential for delamination cracking.

SUMMARY

According to several aspects, a method for mitigating against failure of a particulate matter sensor of an automobile vehicle includes: determining a range of moisture conditions to identify when liquid water is present in a particulate matter (PM) sensor in a vehicle exhaust system; confirming an engine is in an after-run mode; initiating operation of a heating element of the PM sensor; and operating the heating element for a predetermined period of time at a predetermined temperature to remove the liquid water from the PM sensor while the engine is in the after-run mode.

In another aspect of the present disclosure, the method further includes signaling a predetermined dew point of the vehicle exhaust system using a modeled dew point location of the vehicle exhaust system.

In another aspect of the present disclosure, the method further includes if the predetermined dew point has not been reached identifying if the PM sensor has water on or in a ceramic layer of the PM sensor.

In another aspect of the present disclosure, the method further includes if the PM sensor is not faulted having water on or in the ceramic layer of the PM sensor performing a battery voltage determination to identify if a voltage of a vehicle battery meets a predetermined minimum voltage prior to operating the heating element and while the engine is in the after-run mode.

In another aspect of the present disclosure, the method further includes: selecting the predetermined temperature; and choosing the predetermined period of time ranging up to approximately 15 minutes.

In another aspect of the present disclosure, the method further includes if the predetermined dew point has been reached the PM sensor is considered un-saturated.

In another aspect of the present disclosure, the method further includes continuing to monitor dew point conditions effecting the PM sensor to identify if a subsequent vehicle cool-down period has occurred which may cause the PM sensor to become saturated.

In another aspect of the present disclosure, the method further includes supplying operational power to the heating element of the PM sensor from a vehicle battery.

In another aspect of the present disclosure, the method further includes regulating the operational power using a controllable relay.

In another aspect of the present disclosure, the method further includes saving a model of the exhaust system in an electronic control unit further operated to control operation of an engine.

According to several aspects, a method for mitigating against failure of a particulate matter sensor of an automobile vehicle includes: determining if a key-off event is present, identifying an engine is off in a vehicle after-run mode; defining when local environmental conditions are outside of mechanical limits of a particulate matter (PM) sensor; identifying input values to reverse the local environmental conditions of the PM sensor; and controlling operation of a heating element of the PM sensor to achieve the input values to reverse the local environmental conditions during the vehicle after-run mode.

In another aspect of the present disclosure, the method further includes if the key-off event is present, determining if enablement criteria for operation of the heating element are met.

In another aspect of the present disclosure, the determining if enablement criteria for operation of the heating element are met includes performing an odometer check to identify if a vehicle odometer reading is less than a predetermined threshold value.

In another aspect of the present disclosure, the method further includes if the odometer reading is less than the predetermined threshold, performing a calibration to determine a maximum heating time to maximize water removal from the PM sensor.

In another aspect of the present disclosure, the determining if enablement criteria for operation of the heating element are met includes: conducting an ambient temperature check to identify if an ambient temperature is faulted; and reviewing an outside air temperature map to determine a length of time for operation of the heating element of the PM sensor.

In another aspect of the present disclosure, the method further includes: calculating the input values to reverse the local environmental conditions of the PM sensor to remain within the mechanical limits of the PM sensor; and determining an amount of energy to remove a saturation level at a predetermined location within the PM sensor.

In another aspect of the present disclosure, the method further includes identifying if environmental conditions occurring at a predetermined location of the PM sensor between different ceramic layers of the PM sensor are outside of mechanical limits of a ceramic material of the different ceramic layers.

According to several aspects, a particulate matter sensor protection system includes a particulate matter (PM) sensor in a vehicle exhaust system. A model having moisture conditions identifies when liquid water is present at the PM sensor. An automobile vehicle includes an engine having an after-run mode of operation. A heating element of the PM sensor is operated for a predetermined period of time at a predetermined temperature when liquid water is present to remove the liquid water from the PM sensor while the engine is in the after-run mode.

In another aspect of the present disclosure, a vehicle battery has a predetermined minimum voltage to operate the heating element while the engine is in the after-run mode. A controllable relay regulates an operational power provided from the vehicle battery to the heating element.

In another aspect of the present disclosure, a modeled dew point of the vehicle exhaust system signals a predetermined dew point of the vehicle exhaust system.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
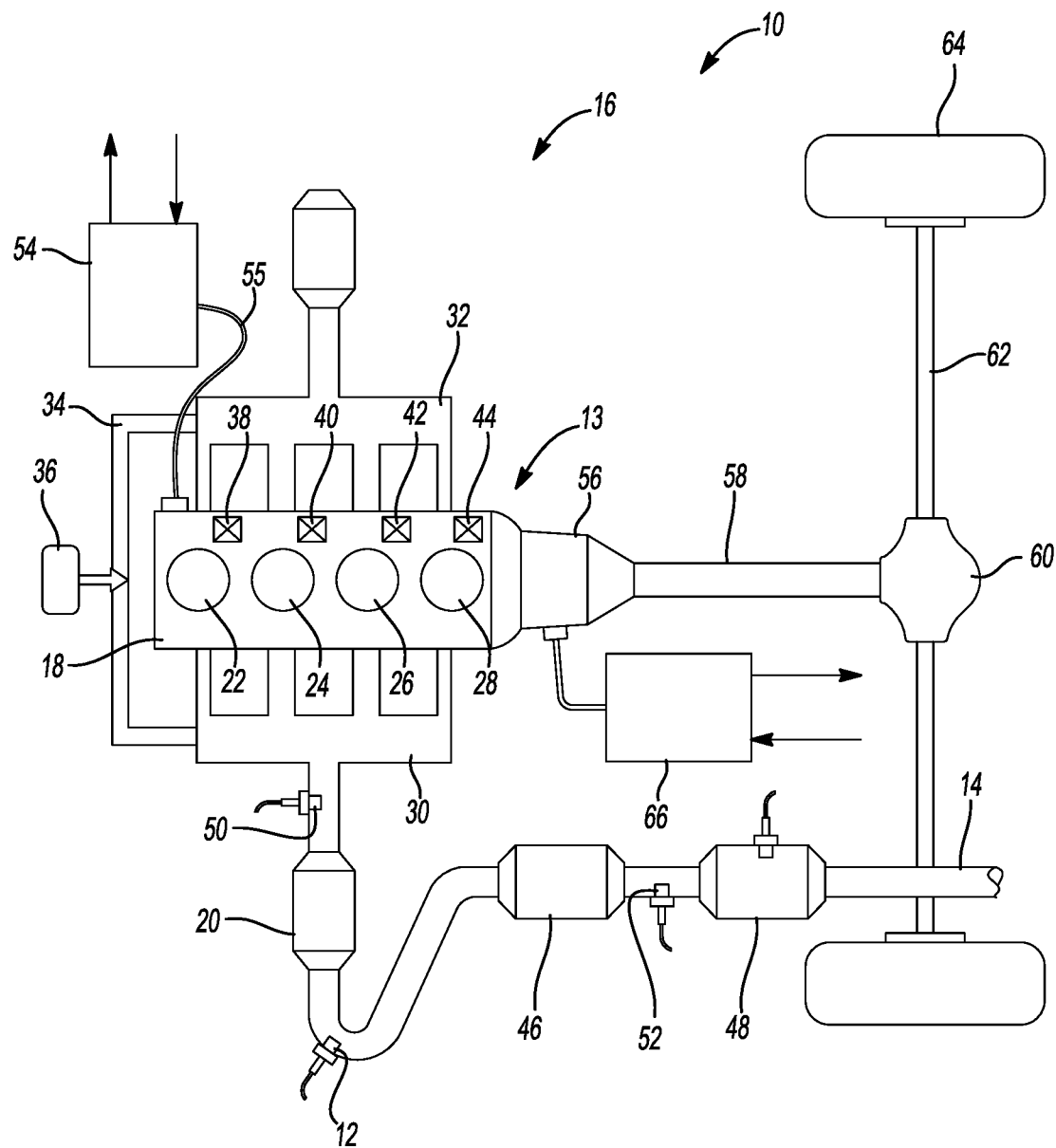
FIG. 1 is a diagrammatic presentation of an automobile vehicle having a particulate matter sensor protection system according to an exemplary aspect.

Referring to FIG. 1, a particulate matter sensor protection system 10 and method for protecting particulate matter sensors provide a system and a method for mitigating against failure of a particulate matter (PM) sensor 12 from mechanical damage which may occur following operation and shutdown of the particulate matter sensor protection system 10. According to several aspects, the PM sensor 12 is part of a vehicle combustion system 13 and is positioned in an exhaust pipe 14 of an automobile vehicle 16 which receives exhaust gas discharged from an engine 18. The engine 18 may be a diesel engine or a gasoline combustion engine. In the exhaust pipe 14, the exhaust gas passes through a particulate matter filter 20 before being discharged to atmosphere. The PM sensor 12 is provided to determine an operating health of the particulate matter filter 20. According to several aspects, the automobile vehicle 16 may include cars, light duty trucks, vans, sport utility vehicles, and the like. According to further aspects, the PM sensor 12 may be used in any exhaust system including but not limited to industrial, heavy equipment and other engine applications.

The engine 18 can include multiple cylinders, which in the example shown include a first cylinder 22, a second cylinder 24, a third cylinder 26 and a fourth cylinder 28. Exhaust gas from the cylinders is directed into an exhaust header 30 prior to discharge into the exhaust pipe 14. Air for combustion of a fossil fuel is directed into the cylinders via an intake manifold 32. Exhaust gas recirculation (EGR) may be provided via an EGR line 34 with EGR flow controlled by an EGR control valve 36. One or more of the cylinders can be deactivated using individual cylinder deactivation control devices 38, 40, 42, 44. A catalyst containing device such as a catalytic converter 46 and a muffler 48 may also be positioned in the exhaust pipe 14. Multiple sensors in addition to the PM sensor 12 are also provided in the exhaust pipe 14. These can include a first temperature sensor 50 and a modeled dew point location 52 in the vehicle exhaust system.

Electrical signals generated by the sensors are forwarded to an electronic control unit (ECU) 54 via a sensor communication path 55. The ECU 54 controls operation of the engine 18 and also controls EGR operation and is therefore in communication with the cylinder deactivation control devices 38, 40, 42, 44 whose quantities are not limiting and are provided for example only, and the EGR control valve 36. The modeled dew point location 52 of the vehicle exhaust system may be saved in a memory of the ECU 54.

The engine 18 provides motive power to a transmission 56 which operates a drivetrain 58. The drivetrain 58 provides power to a differential 60, at least one drive axle 62 and to at least one driven wheel 64. Operational control of the transmission 56 is provided by control signals generated by a transmission electronic control unit (TECU) 66, which may also communicate with the ECU 54.

Referring to FIG. 2 and again to FIG. 1, the particulate matter (PM) sensor 12 includes a sensor body 68 having at least one layer onto which is printed or is connected a circuit 70. The circuit 70 is connected to a monitoring unit such as the ECU 54 and provided with an electrical current. The circuit 70 is normally open which indicates minimal or no presence of a particulate matter which has passed un-filtered through the particulate matter filter 20. Particulate matter is commonly carbon-based, which is electrically conductive. A voltage potential is applied across the circuit 70. Presence of carbon-based particulate matter on the PM sensor 12 will therefore close a portion of the circuit 70 and thereby generate an electrical current whose amplitude is indicative of a degree of particulate matter buildup on the PM sensor 12. When the current level exceeds a predetermined threshold, the PM sensor 12 is deemed to be faulted and an error code is generated by the ECU 54.

Figure 3:
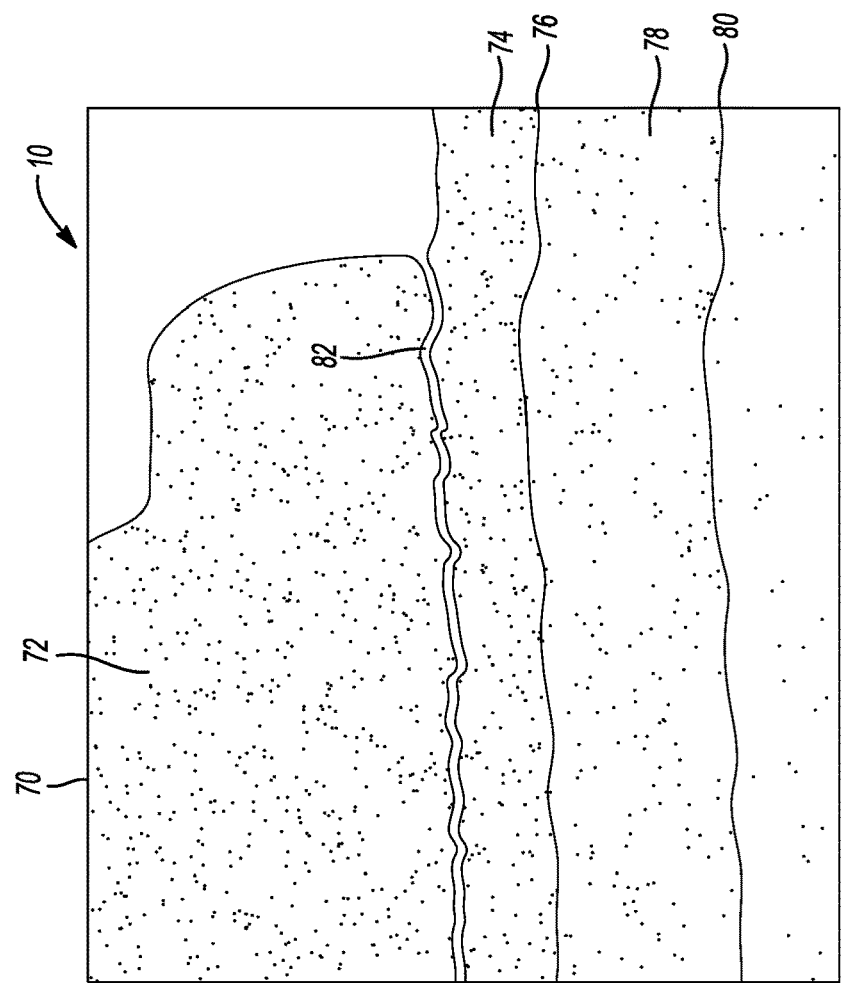
FIG. 3 is an end elevational cross-sectional view taken at section 3 of FIG. 2.
Figure 2:
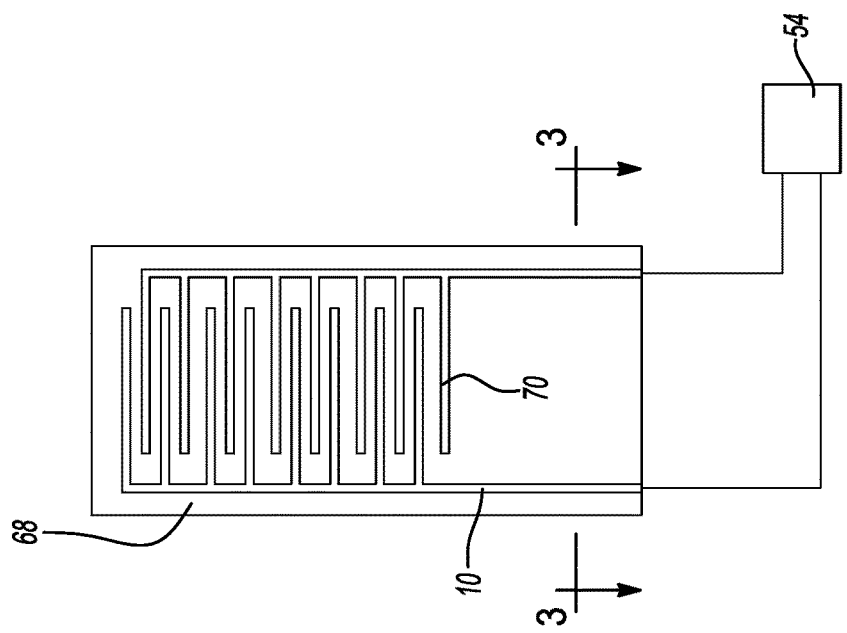
FIG. 2 is a front elevational view of a particulate matter sensor used in the particulate matter sensor protection system of FIG. 1.

Referring to FIG. 3 and again to FIGS. 1 and 2, during operation of the vehicle combustion system 13 exhaust gas temperature is elevated and therefore precludes formation of liquid water in the exhaust pipe 14 and on the PM sensor 12 due to evaporation. Under certain conditions, particularly following a short engine drive cycle which does not reach normal elevated engine and exhaust system temperature to evaporate liquid water which is present, or when a dew point is reached which allows generation of liquid water in the exhaust system, water can accumulate in the exhaust pipe 14 and can partially or fully saturate the PM sensor 12. According to several aspects, the PM sensor 12 may be manufactured using multiple layers of porous ceramic material. As shown in FIG. 3, a first layer 72 may contain the circuit 70, a second layer 74 may contain a heating element 76 and a third layer 78 may contain a temperature sensor 80 used to sense an operating temperature of the PM sensor 12 and control current flow to the heating element 76 for regulating a temperature of the PM sensor 12.

According to several aspects, the second layer 74 may be made from a ceramic material having a different porosity than the first layer 72, and the third layer 78 may be made from a ceramic material having a different porosity than either the first layer 72 or the second layer 74. This difference in porosity may lead to delamination between two or more layers of the PM sensor 12 for the reasons described below.

Following operation and shutdown of the vehicle combustion system 13 moisture can collect in the exhaust pipe 14 and the vehicle combustion system 13. If the PM sensor 12 becomes partially or fully saturated with this moisture, followed by ambient temperatures dropping to or below a freezing temperature, subsequent engine restart heating the PM sensor 12 or subsequent initiation of the PM sensor heating element 76 when the engine 18 is restarted may cause delamination between any two of the layers of the PM sensor 12. An exemplary delamination area 82 is shown between the first layer 72 and the second layer 74, however a similar delamination and delamination area can occur between any successive two of the layers. A delamination area 82 can result in circuit failure of the PM sensor 12.

Figure 4A:
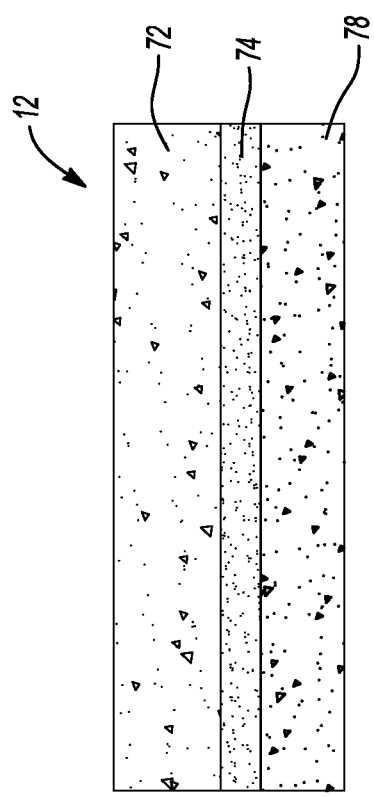
FIG. 4A is an end elevational cross-sectional view similar to section 3 of FIG. 2.
Figure 4B:
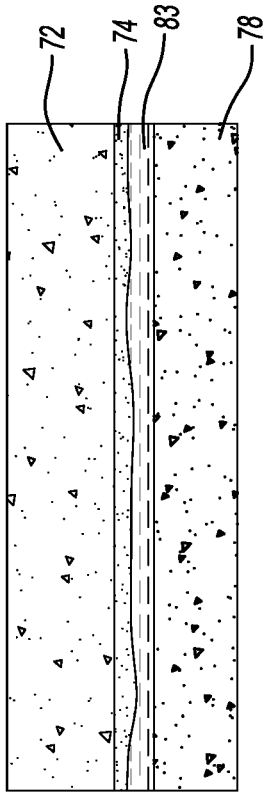
FIG. 4B is an end elevational cross-sectional view modified from FIG. 4A.
Figure 4C:
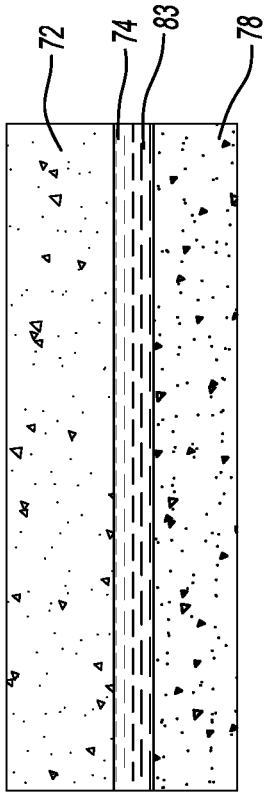
FIG. 4C is an end elevational cross-sectional view modified from FIG. 4B.
Figure 4D:
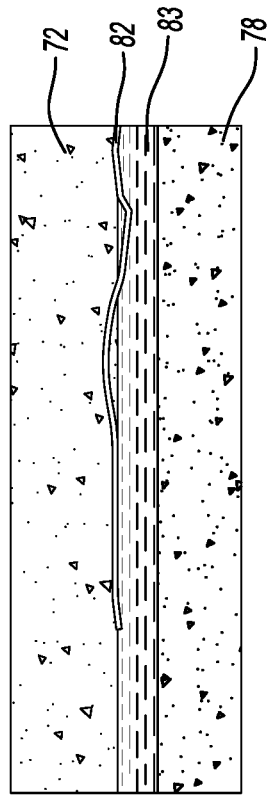
FIG. 4D is an end elevational cross-sectional view modified from FIG. 4C.
Figure 4E:
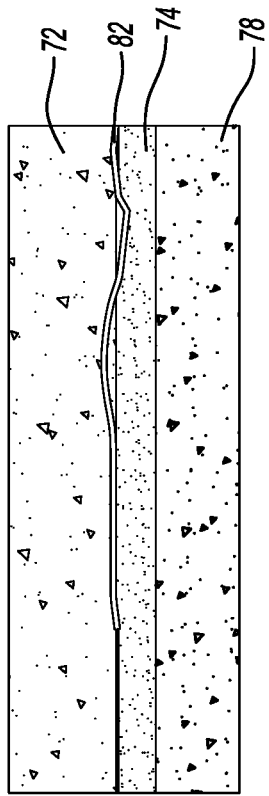
FIG. 4E is an end elevational cross-sectional view modified from FIG. 4D.
Figure 4F:
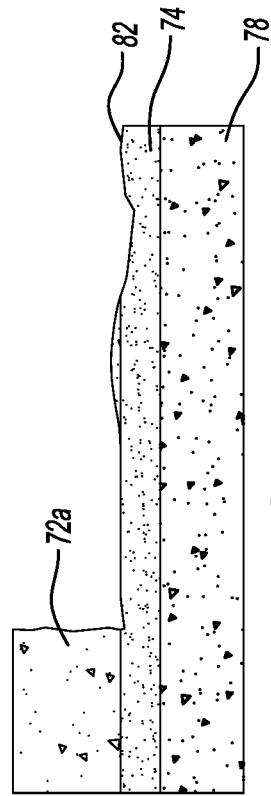
FIG. 4F is an end elevational cross-sectional view modified from FIG. 4E.

Referring generally to FIGS. 4A through 4F sequentially and again to FIG. 3, the stages of water infiltration and crack formation in ceramic layers of an exemplary PM sensor 12 are shown. Referring to FIG. 4A, exemplary layers of ceramic material having different porosities are indicated by the first layer 72, the second layer 74 and the third layer 78. No water is as yet present as shown in FIG. 4A. Referring to FIG. 4B, water 83 has begun to saturate into the second layer 74. Referring to FIG. 4C, the water 83 is shown fully saturating the second layer 74, which after freezing expands and pushes the second layer 74 upward toward the first layer 72. Referring to FIG. 4D, the expansion of frozen water 83 in the second layer 74 displaces the first layer 72 away from the second layer 74 forming the crack 82. Referring to FIG. 4E, after the water 83 evaporates from the second layer 74 the crack 82 remains and spatially separates the first layer 72 and the second layer 74. Referring to FIG. 4F and again to FIG. 4E, a portion of the first layer 72 has delaminated at the location of the crack 82 and broken away, leaving only a portion 72a of the original first layer 72.

Figure 5:
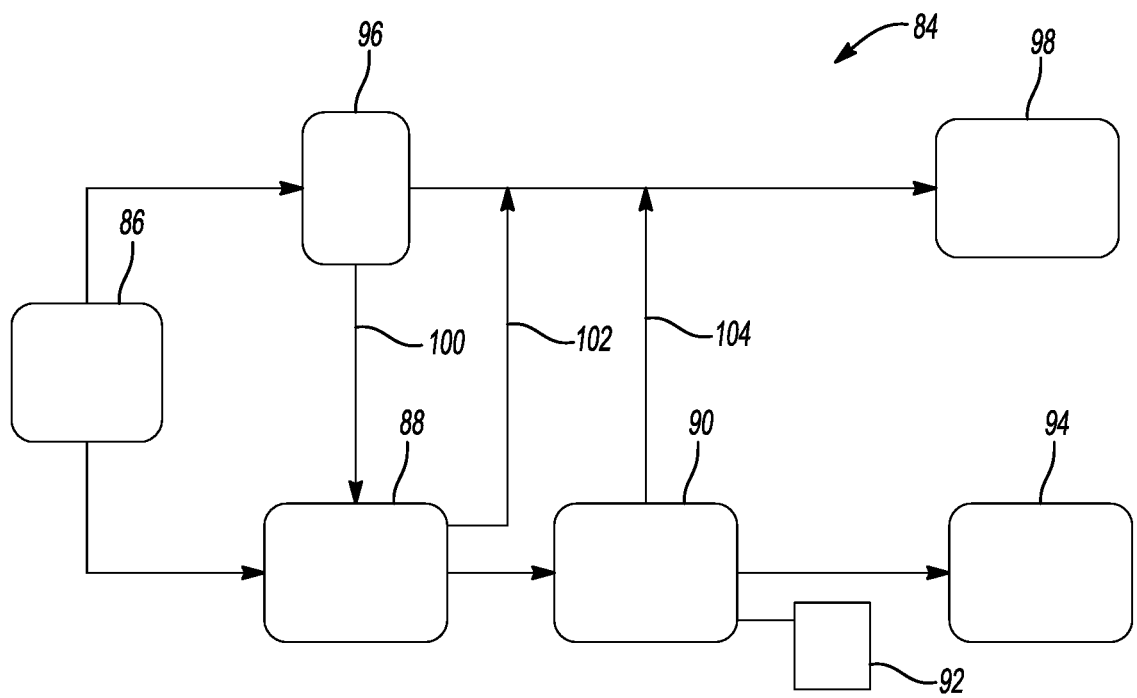
FIG. 5 is a flowchart identifying method steps for use of the system of FIG. 1.

Referring to FIG. 5 and again to FIGS. 1 through 3, a flow diagram defines a dew point program 84 which includes steps taken by the particulate matter sensor protection system 10 to mitigate against a delamination caused circuit failure of the PM sensor 12. In a dew point determination step 86 a model which can be saved in the ECU 54 determines a range of moisture conditions to identify when liquid water is present or when liquid water is no longer present in the vehicle combustion system 13 including the exhaust pipe 14. The modeled dew point location 52 saved in the memory of the ECU 54, which may correspond to a location of the PM sensor 12, may be used to signal when a predetermined dew point has been reached. If the dew point has not been reached the PM sensor 12 may be considered partially or fully saturated and the dew point program 84 in a critical system fault determination step 88 next identifies if the PM sensor 12 is faulted defined as having water on or in a ceramic layer of the PM sensor 12.

If the PM sensor 12 is not faulted having water at, on or in a ceramic layer of the PM sensor 12 a battery voltage determination step 90 is performed to identify if a voltage of a vehicle battery 92 meets a predetermined minimum voltage to initiate operation of the heating element 76 while the engine 18 is in a shutdown or after-run mode. If the predetermined minimum voltage is present in the vehicle battery 92, the dew point program 84 initiates a PM sensor heating action 94 wherein a current is provided to the heating element 76 to operate the heating element 76 at a predetermined temperature for a predetermined period of time to ensure moisture is removed from the PM sensor 12 while the automobile vehicle 16 is in the after-run mode. According to several aspects the predetermined temperature may be selected as approximately 200 degrees Centigrade, however the predetermined temperature can vary above or below 200 degrees Centigrade. The predetermined period of time can be chosen from a range of times ranging up to approximately 15 minutes.

If following the dew point determination step 86 the dew point has been reached the PM sensor 12 may be considered un-saturated or dry and the dew point program 84 in a follow-up determination step 96 continues to monitor dew point conditions effecting the PM sensor 12 to identify if a subsequent vehicle cool-down period has occurred which may cause the PM sensor 12 to become saturated. Such a vehicle cool-down period may result from engine operation for a period of time at idle conditions such as while the operator waits in a parking lot, when the automobile vehicle 16 is coasting at low engine operating power down an extended hill or decline, during stop-and-go driving, and the like. If the determination step 96 identifies the PM sensor 12 continues to be un-saturated or dry, there is no need to energize the heating element 76 and the dew point program 84 ends at a do-not-run in after-run step 98. If the determination step 96 identifies the PM sensor 12 may be saturated the dew point program 84 shifts in a dew point lost step 100 to the critical system fault determination step 88.

If the dew point program 84 in the critical system fault determination step 88 identifies the PM sensor 12 is faulted having water at, on or in a ceramic layer of the PM sensor 12, the PM sensor 12 can no longer be relied on to operate within a predetermined operating range, in a fault determined step 102 the dew point program 84 ends at the do-not-run in after-run step 98. If the dew point program 84 in the battery voltage determination step 90 identifies the voltage of the vehicle battery 92 does not meet the predetermined minimum voltage to initiate operation of the heating element 76 while the engine 18 is in the shutdown or after-run mode, in a battery-low power step 104 the dew point program 84 ends at the do-not-run in after-run step 98.

Referring to FIG. 6 and again to FIGS. 1 through 4, a vehicle electrical system 106 supplies operational power from the vehicle battery 92 to the PM sensor 12 for the predetermined period of time with the automobile vehicle 16 in the after-run mode. Operational power is regulated using a controllable relay 108.

Figure 7:
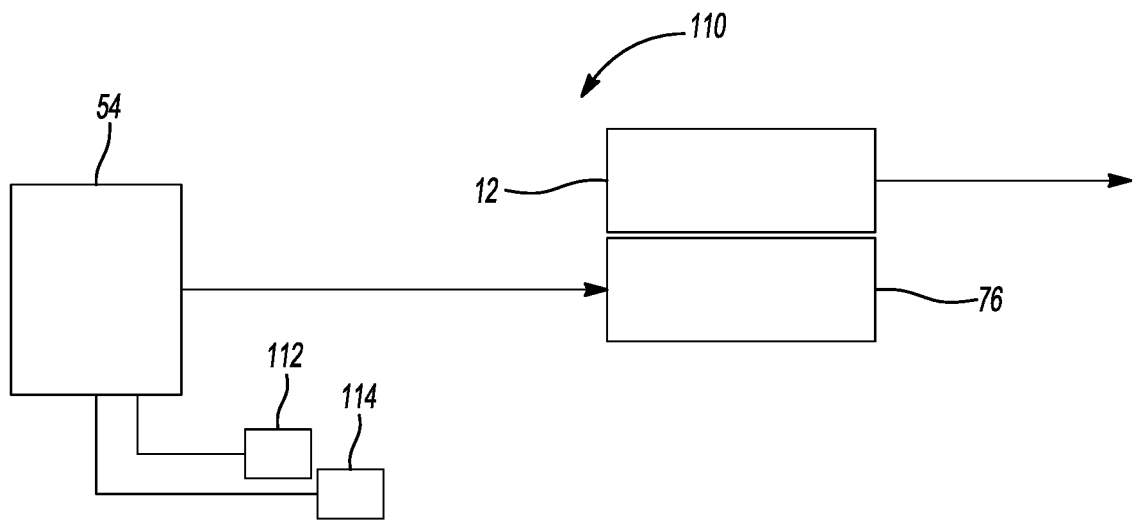
FIG. 7 is a system diagram of control elements used in operation of the particulate matter sensor of FIG. 1.

Referring to FIG. 7 and again to FIGS. 1 through 5, an ECU 54 to sensor communication 110 provides command signals from the ECU 54 for a heater request 112 and a sensor state request 114. The ECU 54 to sensor communication 110 initiates or stops operation of the heating element 76 of the PM sensor 12 with the engine 18 in the after-run mode.

Figure 6:
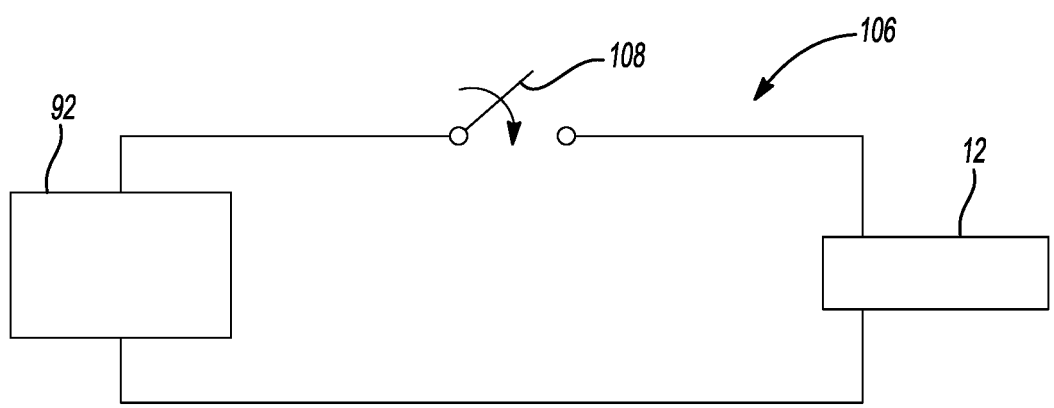
FIG. 6 is a system diagram of control elements used in operation of the particulate matter sensor of FIG. 1.
Figure 8:
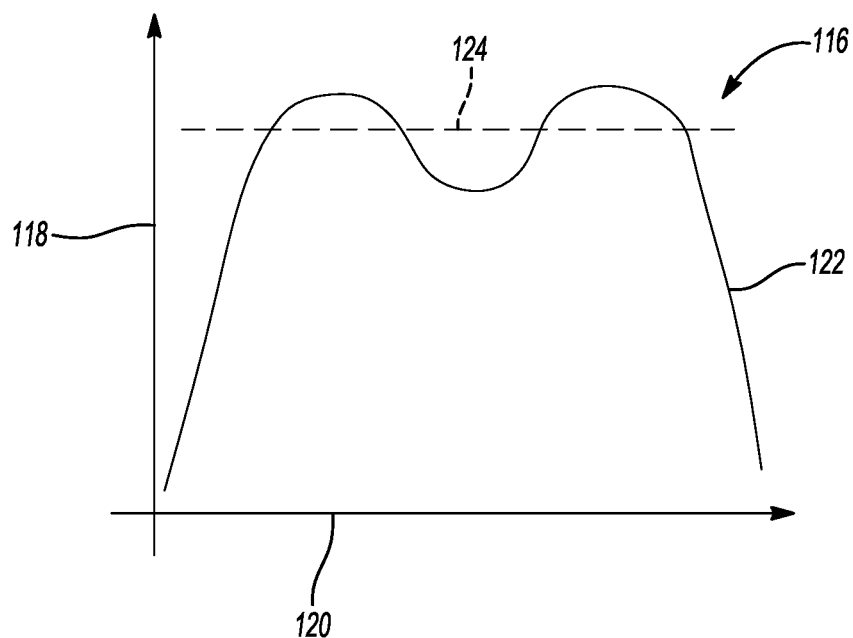
FIG. 8 is a graph showing a temperature over a time for operation of a heating element of the particulate matter sensor of FIG. 1.

Referring to FIG. 8 and again to FIG. 6, a graph 116 identifies a temperature 118 and a time 120 for operation of the heating element 76. The heating element 76 is operated for a target time 122 at a target temperature 124 to remove moisture from the PM sensor 12. As previously noted, the target time 122 may range up to approximately 15 minutes and the target temperature selected may be approximately 200 degrees Centigrade or can vary above or below 200 degrees Centigrade. It is also noted other target times and target temperatures may be selected.

To prevent a mechanical failure of the PM sensor 12, an algorithm detects when the conditions are correct for particulate matter sensor failure and executes an intervention strategy defined by the dew point program 84 during a vehicle after-run period which modifies localized environmental conditions within the PM sensor 12 to a state of the PM sensor 12 that will not fail. The vehicle electrical system 106 supplies power to the controllable relay 108 for the predetermined amount of time while the automobile vehicle 16 is turned off. The ECU to sensor communication 110 commands the sensor heating element 76 to be activated also while the vehicle is turned off, which operates the heating element 76 to the target temperature setpoint.

The intervention strategy defined by the dew point program 84 for the particulate matter sensor protection system 10 operates in three principle steps. In a first step, the criteria when the local environmental conditions are outside of the hardware limits of the PM sensor 12 are defined. A model which may be saved in the ECU 54 is used to predict when the local environmental conditions of the PM sensor 12 are outside of the mechanical limits of the PM sensor 12. For example, the first step identifies if the environmental conditions occurring at a predetermined location such as between different layers of different ceramic material of the PM sensor 12 are outside of mechanical durability limits of the ceramic material. This information may be saved in a memory of the ECU 54. In addition, the first step identifies if the measured or estimated saturation level at the predetermined location is beyond a predetermined limit saved in a memory of the ECU 54.

In a second step, input values to reverse the local environmental conditions of the PM sensor 12 are defined. The model is again used to calculate the inputs to reverse the local environmental conditions of the PM sensor 12 to remain within the mechanical limits of the PM sensor 12. During this step an amount of energy to remove the measured or estimated saturation level at the predetermined location is determined or may be retrieved from a lookup table.

In a third step, the component to the target input conditions are controlled. The remedial action is then executed to reverse the detrimental local environmental conditions in the vehicle after-run mode to not interfere with daily vehicle operation.

Figure 9:
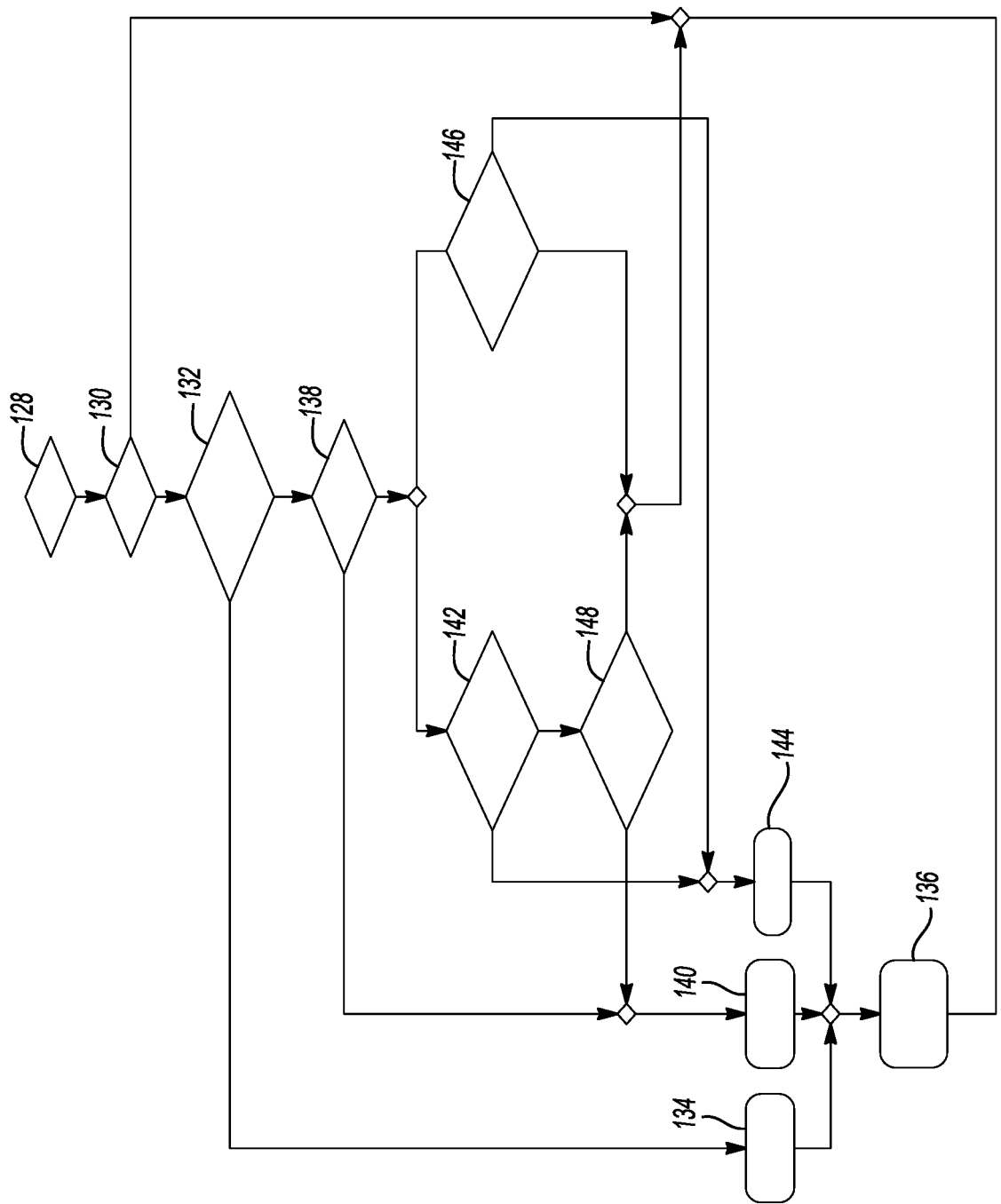
FIG. 9 is a flow diagram identifying alternate method steps for use of the system of FIG. 1.

Referring to FIG. 9 and again to FIGS. 1 through 8, a flow diagram 126 presents steps for use of the particulate matter sensor protection system 10. In an initiating step 128 a determination is made if a key-off event is present, indicating that the engine 18 is off. If the key-off event is present, in an enablement step 130 a determination is made if enablement criteria for operation of the system are met. The initiating step 128 defines one of the criteria defined when local environmental conditions are outside of the hardware limits of the PM sensor 12.

If the enablement criteria are met an odometer check step 132 is performed to identify if the vehicle odometer reading is less than a predetermined threshold value. The odometer check step 132 identifies if the automobile vehicle 16 is new, wherein vehicle operation at a dealership is commonly limited to very short operational periods and therefore when greater water volumes may be present in the vehicle combustion system 13 in the after run mode, or if the automobile vehicle 16 is being used by an owner operator for longer periods of time when less water volume is anticipated to be present in the after run mode. If the odometer reading is less than the predetermined threshold a calibration step 134 is performed to determine a maximum heating time to maximize water removal from the system and from the PM sensor 12. The calibration step 134 is one of the steps defining input values to reverse local environmental conditions impacting the PM sensor 12.

The calibration step 134 is followed by a functionality step 136 wherein a sensor bus for the PM sensor 12 is confirmed to be active and the PM sensor 12 is energized in a protective heating mode with full functionality. The odometer check step 132 provides one of the criteria defined when local environmental conditions are outside of the hardware limits of the PM sensor 12.

If the odometer reading is greater than the predetermined threshold in a following ambient temperature check step 138, a determination is made if an ambient temperature is faulted. The ambient temperature check step 138 provides one of the criteria defined when local environmental conditions are outside of the hardware limits of the PM sensor 12.

If during the ambient temperature check step 138 the ambient temperature is identified as faulted, in an outside air temperature check 140 an outside air temperature map may be reviewed to determine a recommended length of time for operation of the PM sensor heating element 76, and the functionality step 136 is then performed. The outside air temperature check 140 may be one of the steps defining input values to reverse local environmental conditions impacting the PM sensor 12.

If during the ambient temperature check step 138 the ambient temperature is not identified as faulted a dew point reached step 142 is performed. The dew point reached step 142 provides one of the criteria defined when local environmental conditions are outside of the hardware limits of the PM sensor 12.

During the dew point reached step 142 a map 144 based on dew point percentage is consulted to determine a recommended length of time for operation of the PM sensor heating element 76 to remove remaining water at the PM sensor 12, and the functionality step 136 is then performed. Consulting the map 144 based on dew point percentage is performed as one of the steps defining input values to reverse local environmental conditions impacting the PM sensor 12.

If during the ambient temperature check step 138 the ambient temperature is not identified as faulted, in lieu of the dew point reached step 142 a measurement lost step 146 is performed. As used herein, "measurement lost" is defined as a condition when after the dew point temperature has been reached the PM sensor 12 subsequently cools down and a PM sensor temperature falls below the dew point temperature. During the measurement lost step 146 a determination is made if the dew point has been lost by determining if the dew point temperature is less than a predetermined threshold dew point temperature. The measurement lost step 146 provides a final one of the criteria defined when local environmental conditions are outside of the hardware limits of the PM sensor 12.

A particulate matter sensor protection system 10 of the present disclosure offers several advantages. These include definition of criteria when local environmental conditions are outside of the limits of a PM sensor, definition of input values to reverse the local environmental conditions, and provision of control criteria to control the PM sensor to achieve target input conditions. A method is provided for mitigating failure of a particulate matter sensor 12 from mechanical damage which may occur following operation and shutdown of the particulate matter contamination recovery system due to water saturation of different porosity ceramic material layers of the PM sensor.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for mitigating against failure of a particulate matter sensor of an automobile vehicle, comprising:
    determining a range of moisture conditions to identify when liquid water is present in a particulate matter (PM) sensor and in a vehicle exhaust system;
    confirming an engine is in an after-run mode;
    determining if enablement criteria for operation of a heating element of the PM sensor are met by performing a check of a vehicle odometer to identify if a reading of the vehicle odometer is less than a predetermined threshold value, wherein if the reading of the vehicle odometer is less than the predetermined threshold value, performing a calibration to determine a maximum heating time to maximize water removal from the PM sensor;
    initiating operation of the heating element of the PM sensor; and
    operating the heating element for a predetermined period of time less than or equal to the maximum heating time at a predetermined temperature to remove the liquid water from the PM sensor while the engine is in the after-run mode.

2. The method for mitigating against failure of the particulate matter sensor of the automobile vehicle of claim 1, further including signaling a predetermined dew point of the vehicle exhaust system using a modeled dew point location within the vehicle exhaust system.

3. The method for mitigating against failure of the particulate matter sensor of the automobile vehicle of claim 2, wherein if the if the predetermined dew point has not been reached identifying if the PM sensor is faulted defined as having water in a ceramic layer of the PM sensor.

4. The method for mitigating against failure of the particulate matter sensor of the automobile vehicle of claim 3, wherein if the PM sensor heating element is not faulted performing a battery voltage determination to identify if a voltage of a vehicle battery meets a predetermined minimum voltage prior to operating the heating element and while the engine is in the after-run mode.

5. The method for mitigating against failure of the particulate matter sensor of the automobile vehicle of claim 2, wherein if the predetermined dew point has been reached the PM sensor is considered un-saturated.

6. The method for mitigating against failure of the particulate matter sensor of the automobile vehicle of claim 5, further including continuing to monitor dew point conditions effecting the PM sensor to identify if a subsequent vehicle cool-down period has occurred which may cause the PM sensor to become saturated.

7. The method for mitigating against failure of the particulate matter sensor of the automobile vehicle of claim 1, further including supplying operational power to the heating element of the PM sensor from a vehicle battery.

8. The method for mitigating against failure of the particulate matter sensor of the automobile vehicle of claim 7, further including regulating the operational power using a controllable relay.

9. The method for mitigating against failure of the particulate matter sensor of the automobile vehicle of claim 1, further including:
    selecting the predetermined temperature; and
    choosing the predetermined period of time ranging up to approximately 15 minutes.

10. The method for mitigating against failure of the particulate matter sensor of the automobile vehicle of claim 1, further including saving a model including an exhaust system dew point in an electronic control unit further operated to control operation of an engine.

11. A method for mitigating against failure of a particulate matter sensor of an automobile vehicle, comprising:
    determining if a key-off event is present, identifying a vehicle engine is off in a vehicle after-run mode;
    defining when local environmental conditions are outside of mechanical limits of a particulate matter (PM) sensor;
    calculating input values to reverse the local environmental conditions of the PM sensor in order to remain within the mechanical limits of the PM sensor including determining an amount of energy to remove a saturation level at a predetermined location within the PM sensor; and
    controlling operation of a heating element of the PM sensor to achieve the input values to reverse the local environmental conditions during the vehicle after-run mode.

12. The method for mitigating against failure of the particulate matter sensor of the automobile vehicle of claim 11, wherein if the key-off event is present, determining if enablement criteria for operation of the heating element are met.

13. The method for mitigating against failure of the particulate matter sensor of the automobile vehicle of claim 12, wherein the determining if enablement criteria for operation of the heating element are met includes performing a check of a vehicle odometer to identify if a reading of the vehicle odometer is less than a predetermined threshold value.

14. The method for mitigating against failure of the particulate matter sensor of the automobile vehicle of claim 13, wherein if the reading of the vehicle odometer is less than the predetermined threshold value, performing a calibration to determine a maximum heating time to maximize water removal from the PM sensor.

15. The method for mitigating against failure of the particulate matter sensor of the automobile vehicle of claim 14, wherein the determining if enablement criteria for operation of the heating element are met includes reviewing an outside air temperature map to determine a length of time for operation of the heating element of the PM sensor to remove water present at the PM sensor from the PM sensor.

16. The method for mitigating against failure of the particulate matter sensor of the automobile vehicle of claim 11, further including identifying if environmental conditions occurring at a predetermined location of the PM sensor between different ceramic layers of the PM sensor are outside of mechanical limits of a ceramic material of the different ceramic layers.

* * * * *